(12) United States Patent
Gottschalk-Gaudig et al.

(10) Patent No.: US 12,448,486 B2
(45) Date of Patent: Oct. 21, 2025

(54) FORMULATION OF CNT-CONTAINING SILOXANES CONTAINING SILICIC ACID

(71) Applicant: WACKER CHEMIE AG, Munich (DE)

(72) Inventors: Torsten Gottschalk-Gaudig, Mehring (DE); Claudia Kirschner, Stubenberg (DE)

(*) Notice: Subject to any disclaimer, the term of this patent is extended or adjusted under 35 U.S.C. 154(b) by 668 days.

(21) Appl. No.: 17/773,181

(22) PCT Filed: Oct. 30, 2019

(86) PCT No.: PCT/EP2019/079695
§ 371 (c)(1),
(2) Date: Apr. 29, 2022

(87) PCT Pub. No.: WO2021/083514
PCT Pub. Date: May 6, 2021

(65) Prior Publication Data
US 2022/0380551 A1 Dec. 1, 2022

(51) Int. Cl.
*C08G 77/20* (2006.01)
*B33Y 70/10* (2020.01)
*C08K 3/04* (2006.01)
*C08K 3/36* (2006.01)

(52) U.S. Cl.
CPC .......... *C08G 77/20* (2013.01); *B33Y 70/10* (2020.01); *C08K 3/041* (2017.05); *C08K 3/36* (2013.01); *C08K 2201/001* (2013.01); *C08K 2201/005* (2013.01); *C08K 2201/006* (2013.01); *C08K 2201/011* (2013.01)

(58) Field of Classification Search
CPC .................. C08G 77/00; C08L 83/00
See application file for complete search history.

(56) References Cited

U.S. PATENT DOCUMENTS

| | | | |
|---|---|---|---|
| 8,333,946 B2* | 12/2012 | Gottschalk-Gaudig | C01B 13/145 423/335 |
| 2010/0160543 A1* | 6/2010 | Frese | B29B 7/48 524/588 |
| 2017/0081499 A1† | 3/2017 | Hotta | |
| 2018/0036953 A1* | 2/2018 | Gottschalk-Gaudig | B29C 64/40 |

FOREIGN PATENT DOCUMENTS

| | | | |
|---|---|---|---|
| CN | 106046739 A | | 10/2016 |
| CN | 107298859 A | | 10/2017 |
| CN | 107325521 A | * | 11/2017 |
| CN | 107383880 A | | 11/2017 |
| CN | 107722631 A | | 2/2018 |
| CN | 108504106 A | | 9/2018 |
| CN | 108641370 A | | 10/2018 |
| CN | 109082124 A | | 12/2018 |
| CN | 108688252 B | | 7/2020 |
| EP | 1433749 B1 | | 4/2006 |
| JP | H1143319 A | * | 2/1992 |
| JP | 2011517327 A | | 6/2011 |
| JP | 2013245329 A | | 12/2013 |
| WO | 2017143961 A1 | | 8/2017 |

OTHER PUBLICATIONS

English machine translation of CN 107325521 A (Year: None).*
English machine translation of JP H1143319 A (Year: None).*
C.-L. Wu et al., Mechanical Properties of PDMS/CNTs Nanocomposites, Materials Research Society Symp. Proceedings, vol. 1056, 2008, MRS (US).
S. S. Hassouneh et al., Soft and flexible conductive PDMS/MWCNT composites, Journal of Applied Polymer Science 2017, www.materialsviews.com, 44767, Wiley Periodicals, Inc. (US).
A. Behrens et al., Carbon Nanotube-Silicone Rubber on Active Thin-Film Implants, Phys. Status Solid A 2018, 215, 1700873, WILEY-VCH Verlag Gmbh & Co. KGaA, Weinheim (DE).
C.X. Liu et al., Strain-Dependent Resistance of PDMS and Carbon Nanotubes Composite Microstructures, IEEE Transactions on Nanotechnology, vol. 9, 5 (2010), 590-595, IEEE (US).
G.W. Sears, Determination of Specific Surface Area of Colloidal Silica by Titration with Sodium Hydroxide, Analytical Chem. 1956, 28, p. 1981-1983, American Chemical Society (US).

* cited by examiner
† cited by third party

*Primary Examiner* — Randy P Gulakowski
*Assistant Examiner* — Holley Grace Hester

(57) ABSTRACT

A low-viscosity, electrically conductive, CNT-containing siloxane composition along with processes for producing the same, uses for the same and articles made therefrom. The siloxane composition includes a) 0.1-5 wt % CNTs; b) 70-97.9 wt % of at least one siloxane, which is selected from compounds of the general formula (I); c) 1-20 wt % of at least one hydrophobic silicic acid, which is surface-silylated by at least one organosilicon compound selected from organosilanes of the formula (IV) and organosilazanes of the formula (V); and d) 0-5 wt % of other fillers. Where the proportions relate to the total weight of the composition and the total of all components a) to d) equals 100 wt %.

20 Claims, No Drawings

FORMULATION OF CNT-CONTAINING SILOXANES CONTAINING SILICIC ACID

CROSS-REFERENCE TO RELATED APPLICATIONS

This application is a U.S. National Phase application of PCT Application No. PCT/EP2019/079695 filed on Oct. 30, 2019 the disclosure of which is incorporated by reference herein in its entirety.

The present invention discloses formulations of CNT-containing siloxanes. The invention further discloses a process for producing these formulations and the use thereof as a formative material in 3D printing or screen printing.

Electrically conductive silicone elastomers are known and commercially available, for example the ELASTOSIL® LR 3162 A/B and POWERSIL® 466 A/B products from Wacker Chemie AG. These typically contain conductivity carbon blacks as conductivity-imparting components. The carbon blacks are added in an amount of about 5-10% by weight and increase the viscosity of the mixture such that customary formative processes such as injection molding and in particular 3D printing are no longer possible.

The use of anisotropic fillers, for example MWCNTs (MWCNT=multi-walled carbon nanotubes) makes it possible to reduce the amount of conductivity filler to about 0.5-3% by weight, thus resulting in flowable compositions. MWCNT-containing silicone elastomers are known ((a) C.-L. Wu, H.-C. Lin, C.-H. Huang, M.-C. Yip, W. Fang, MRS Online Proceedings Library 2007, 1056; (b) S. S. Hassouneh, L. Yu, A. L. Skov, A. E. Daugaard, Journal of Applied Polymer Science 2017, 134, n/a-n/a; (c) A. Behrens, K. Foremny, T. Doll, physica status solidi (a) 2018, 215, 1700873; and (d) C. X. Liu, J. W. Choi, IEEE Transactions on Nanotechnology 2010, 9, 590-595). These are typically high-temperature crosslinking silicone elastomers having a high viscosity >1,000,000 mPa*s. Production is effected by means of kneaders and/or roller mills. These methods are time-consuming and labor-intensive and also have the disadvantage that the conductivity of the mixtures quickly collapses, presumably since the CNTs (CNTs=carbon nanotubes) undergo partial mechanical destruction.

Even if CNT particles remain heterogeneously distributed after mixing, the electrical conductivity can be severely impaired. Since CNTs are heavily entangled by van der Waals forces and CNTs are often present in the form of large bundles or dense agglomerates, uncontrolled electronic changes can occur. Uniform mixing (dispersing) of the CNTs is therefore the main challenge in the production of CNT-containing siloxanes.

Many processes for mixing CNTs into siloxanes or silicone composite materials are already known.

CN107298859 discloses production of flexible CNT-containing siloxanes using a planetary dispersing vacuum mixer for 90 minutes. Only the fracture properties and the tensile elongation are determined. Nothing is said about the power input, nor is the resistance of the materials known.

CN106046739A discloses electrically conductive composite materials containing, inter alia, silicones (gamma-mercaptopropyltrimethoxysilane, phenylsilicone oil) and CNTs. They are mixed using high-speed mixers. Volume resistances between 1.03 Ω*cm and 1.13 Ω*cm achieved. However, no information about power input or the method of measurement of resistance is provided, thus making the values harder to compare.

CN107722631A discloses a thermally conductive paste containing inter alia silicone oil, zinc oxide and a composite of CNTs and micro-expanded graphite. The mixture is produced in a kneader. The use of kneaders is often disadvantageous since they can only be used in the case of high-viscosity siloxanes. In addition, the CNTs could be destroyed by the mechanical stress, thus impairing conductivity.

CN 109082124A discloses electromagnetic shielding materials composed of photocurable silicone composite materials comprising multi-armed CNTs. During production, the CNTs are initially dispersed in THF using ultrasound before the silicone and the crosslinker are mixed in at 800-1000 rpm. This is followed by a further ultrasonic treatment for 45-60 minutes. Ultrasonic treatments are likewise often disadvantageous, since the mechanical stress is very high and CNTs can be destroyed as a result. Furthermore, this process requires a solvent to achieve uniform dispersing. This necessitates an additional operating step to remove the solvent again. Solvent residues can cause blistering in the product and impair the mechanical properties.

CN 108688252A discloses a mixture of CNTs in polydimethylsiloxane (PDMS) as a component of a film of a shock-sensitive actuator. To produce this mixture, PDMS is first dissolved in a solvent (n-hexane or cyclohexane). The CNTs are then mixed in at room temperature at 2000-2500 rpm for 5-8 hours. A crosslinker is then added (Dow Corning Mixture 184). No electrical properties are determined from this mixture. The solvent is also a disadvantage in this process, and no information about the mixer and the power input is disclosed.

CN 108504106A discloses a conductive silicone composite material comprising CNTs. To produce this material the CNTs are first mixed with THF with stirring and then dispersed using ultrasound. Then the silicone is added, the mixture is stirred at room temperature for 90 minutes and subjected to ultrasonic treatment. A crosslinker is then added. Dielectric constants of 250-980 are determined at 100 Hz. This process also has the previously described disadvantages of ultrasonic treatments and use of solvents.

CN 107383880A discloses flexible, conductive CNT-containing silicones. To produce these silicones a partially crosslinked silicone (PDMS) is first produced and dissolved in hexane. CNTs are then added and dispersed in the silicone by ultrasound (intermittent treatment: 5 minutes US, 3 minutes pause, 60 minutes in total—no beneficial effect of the pause is described, the reason therefor is probably high heat generation or mechanical stress on the sonotrode). Once the hexane has been removed, crosslinker is once again added to obtain the final product. Resistances of 0.8-39 Ω*cm at room temperature are attained. This process also has the previously described disadvantages of ultrasonic treatments and use of solvents.

It is known that when using a typical shaping process, for example injection molding, jetting or laser transfer printing, low-viscosity, electrically conductive siloxane formulations exhibit instantaneous structure formation after termination of the shearing occurring during the shaping process. This can lead, for example, to rough surfaces or to cavities in the case of multilayer printing, and is therefore a major disadvantage of these siloxane formulations. The structural relaxation rate would have to be reduced such that 60 seconds after termination of the shear stress a value below 80% of the static viscosity is obtained. Only such a value allows smooth surfaces to be produced in 3D printing by the drop-on-demand method and avoids the formation of cavities or defects in multi-layer printing.

The relaxation effect occurs both in H-siloxanes and in vinyl siloxanes alone as well as in mixtures thereof.

Vinylsiloxanes are typically vulcanized (=crosslinked) with a crosslinker via a hydrosilylation in the presence of Pt catalysts, wherein the crosslinker is an H-siloxane containing at least 3 hydrogen atoms in the molecule.

In CN107298859 the composition is admixed with nanosilica, preferably gas-phase silica (=pyrogenic silica), as filler. However, it is not disclosed whether hydrophilic or hydrophobic silica is concerned. It must be concluded from the disclosed compositions that the silica is hydrophilic silica which may be modified with dimethylsiloxy groups in situ during the production process by the silicone oil that is also added.

It is accordingly an object of the present invention to provide a process for producing low-viscosity, electrically conductive, CNT-containing siloxanes which does not exhibit the disadvantages of the prior art.

It has now been found that, surprisingly, the addition of silica in an amount of about 1-20% by weight made it possible to reduce the structural relaxation rate such that 60 seconds after termination of the shear stress a value of ≤80% of the static viscosity is obtained. In the case of silica-free formulations this value is >80% after 60 seconds. It has also been found that, surprisingly, the recited addition quantities of silica result in only a moderate decrease in the electrical conductivity of the formulation. It has also been found that achieving the inventive effect requires that the silicone be silylated with —O—SiR$^1$R$^2$R$^3$ surface groups, wherein R$^1$, R$^2$, R$^3$ are independently of one another selected from halogenated or unsubstituted C$_1$-C$_{24}$-hydrocarbon radicals. Such silicas are hydrophobic. Experience has shown that the use of hydrophilic silicas results in formulations that are not storage-stable.

It has also been found that, surprisingly, simple dissolver dispersing makes it possible to obtain CNT-containing and silica-containing siloxanes having excellent electrical conductivity coupled with good flowability and relaxation capacity.

The subject matter of the invention is a low-viscosity, electrically conductive siloxane composition containing
  a) 0.1-5% by weight of CNTs;
  b) 70-97.9% by weight of at least one siloxane selected from compounds of general formula (I)

$$(SiO_{4/2})_a(R^xSiO_{3/2})_b(R^x{}_2SiO_{2/2})_c(R^x{}_3SiO_{1/2})_d \qquad (I),$$

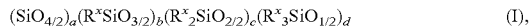

wherein the radicals R$^x$ are independently of one another selected from the group consisting of (i) hydrogen, (ii) —CH=CH$_2$, (iii) unsubstituted or fluorinated C$_1$-C$_{20}$-hydrocarbon radical, (iv) phenyl radical and (v) —OH and wherein the indices a, b, c and d indicate the number of the respective siloxane unit in the compound and independently of one another represent an integer in the range from 0 to 100 000, wherein a+b+c+d≥2;
  c) 1-20% by weight of at least one hydrophobic silica which is surface-silylated with at least one organosilicon compound selected from organosilanes of formula (IV) and organosilazanes of formula (V)

$$R^1R^2R^3Si-Y \qquad (IV),$$

$$R^1R^2R^3Si-NH-SiR^1R^2R^3 \qquad (V),$$

wherein the radicals R$^1$, R$^2$, R$^3$ are each independently selected from halogenated or unsubstituted C$_1$-C$_{24}$-hydrocarbon radicals; and
  wherein the radical Y is selected from the group consisting of (i) halogen atom, (ii) —OR$^x$ and (iii) —OC(=O)OR$^x$, wherein R$^x$ is in each case selected from the group consisting of (i) hydrogen and (ii) substituted or unsubstituted C$_1$-C$_{24}$-hydrocarbon radical, wherein substituted is to be understood as meaning that at least one CH$_2$ group, but not the one bonded to silicon, may be replaced by —O—;
  d) 0-5% by weight of other fillers;
  wherein the proportions are based on the total weight of the composition and the components a) to d) sum to 100% by weight.

In the context of the present invention the term low-viscosity is to be understood as meaning a viscosity of ≤1,000,000 mPa*s at a shear rate of 1 s$^{-1}$. measured at a temperature of 25° C. Since the addition of CNTs increases the viscosity of the siloxanes the lowest possible viscosity value is determined by the pure siloxanes.

The term CNT refers to carbon nanotubes. These are nanomaterials in the shape of hollow cylinders which consist of hexagonal carbon structures. A person skilled in the art is not restricted in his choice of CNTs; he may use any CNTs that are commercially available or can be produced using literature methods.

The CNTs are employed in a content in the range of 0.1-5% by weight based on the total weight of the composition; a content in the range from 0.5-2% by weight is preferred.

It is preferable to employ CNTs having an average diameter of 1-50 nm and an aspect ratio (ratio of length to diameter) of ≤1000.

It is possible to employ SWCNTs (SWCNT=single-walled carbon nanotubes) or MWCNTs (MWCNTS=multi-walled carbon nanotubes), MWCNTs being preferred.

At least one siloxane is employed, where this also encompasses mixtures of compounds of general formula (I). These mixtures may be mixtures of siloxanes having the same substitution pattern but different indices or mixtures of siloxanes having different substitution patterns or mixtures of siloxanes having different substitution patterns and different indices.

A mixture of compounds of general formula (I) having the same substitution pattern but different indices is present in particular in the case of polysiloxanes. However, for the sake of simplicity it is not the individual compounds that are specified for polysiloxanes but rather an average formula (I') that is similar to formula (I)

$$(SiO_{4/2})_a(R^xSiO_{3/2})_b(R^x{}_2SiO_{2/2})_c(R^x{}_3SiO_{1/2})_d \qquad (I'),$$

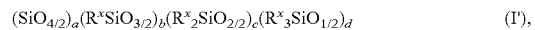

wherein the radicals R$^x$ are as defined in formula (I) but the indices a, b, c, d independently of one another represent a number in the range from 0 to 100 000 and indicate the average content of the respective siloxane unit in the mixture.

It is preferable to employ mixtures of formula (I'), wherein the indices a, b, c, d are independently of one another selected from a number in the range from 0 to 1000.

It is preferable when the radicals R$^x$ in formula (I) or formula (I') are independently of one another selected from the group consisting of H, —OH, methyl, ethyl, propyl, phenyl, —CH=CH$_2$, trifluoromethyl and trifluoropropyl. It is particularly preferable when the radicals R$^x$ in formula (I) or formula (I') independently of one another are selected from the group consisting of H, methyl, ethyl, propyl, phenyl and —CH=CH$_2$.

Mixtures of siloxanes having different substitution patterns and different indices are especially present when differently substituted polysiloxanes are mixed with one another, for example H-polysiloxanes and vinyl-polysiloxanes.

It is preferable to employ at least one siloxane selected from compounds of general formula (II)

  (II), wherein the radicals $R^x$ are independently of one another selected from the group consisting of (i) hydrogen, (ii) —CH=CH$_2$, (iii) unsubstituted or fluorinated $C_1$-$C_{20}$-hydrocarbon radical, (iv) phenyl radical and (v) —OH and wherein the index c indicates the number of the respective siloxane unit in the compound and represents an integer in the range from 0 to 100 000.

It is preferable when the radicals $R^x$ in formula (II) are independently of one another selected from the group consisting of H, —OH, methyl, ethyl, propyl, phenyl, —CH=CH$_2$, trifluoromethyl and trifluoropropyl. It is particularly preferable when the radicals $R^x$ in formula (II) are independently of one another selected from the group consisting of H, methyl, ethyl, propyl, phenyl and —CH=CH$_2$.

Examples of Preferred Siloxanes and Polysiloxanes:

HMe$_2$Si—O—SiMe$_2$H, ViMe$_2$Si—O—SiMe$_2$Vi, and polysiloxanes having the average formulae H-Me$_2$Si—(O—SiMe$_2$)$_m$—O—SiMe$_2$-H,
Me$_3$Si—O—(SiMe$_2$-O)$_n$(SiHMe-O)$_o$—SiMe$_3$,
H-Me$_2$Si—(O—SiMe$_2$)$_n$(SiHMe-O)$_o$—SiMe$_2$-H
ViMe$_2$Si—(O—SiMe$_2$)$_m$—O—SiMe$_2$Vi,
Me$_3$Si—O—(SiMe$_2$-O)$_n$(SiViMe-O)$_o$—SiMe$_3$,
ViMe$_2$Si—(O—SiMe$_2$)$_n$(SiViMe-O)$_o$—O—SiMe$_2$Vi, wherein the indices m, n and o are in each case a number in the range from 1 to 100 000.

In a first particular embodiment the siloxane employed in the siloxane composition according to the invention is a siloxane mixture containing a) at least one H-siloxane selected from compounds of general formula (IIa)

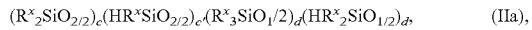  (IIa), wherein the radicals $R^x$ are independently of one another selected from the group consisting of (i) unsubstituted or fluorinated $C_1$-$C_{20}$-hydrocarbon radical and (ii) phenyl radical and wherein the indices c, c', d and d' indicate the number of the respective siloxane unit in the compound, wherein c and c' each represent an integer in the range from 0 to 100 000 and wherein d and d' may each assume the value 0 or 1 or 2, with the proviso that the sum of d and d' is 2; and b) at least one vinylsiloxane selected from compounds of general formula (IIb)

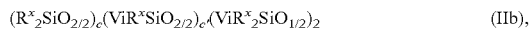  (IIb), wherein the radicals Vi each represent a —CH=CH$_2$ group bonded to the silicon atom; and
wherein the radicals $R^x$ are independently of one another selected from the group consisting of (i) unsubstituted or fluorinated $C_1$-$C_{20}$-hydrocarbon radical and (ii) phenyl radical; and
wherein the indices c and c' indicate the number of the respective siloxane unit in the compound, and c and c' each represent an integer in the range from 0 to 100 000.

Such a siloxane mixture is also referred to as a hydrosilylable mixture, since in the presence of any known hydrosilylation catalysts and under suitable reaction conditions it can undergo reaction to form ethylene bridges between the siloxane chains.

In a second particular embodiment the siloxane employed in the siloxane composition according to the invention is a siloxane mixture containing a) 1-10% by weight of at least one H-siloxane of general formula (III) as a crosslinker

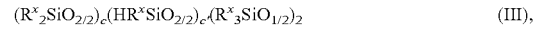  (III), wherein the radicals $R^x$ are independently of one another selected from the group consisting of (i) unsubstituted or fluorinated $C_1$-$C_{20}$-hydrocarbon radical and (ii) phenyl radical, and wherein the indices c and c' indicate the number of the respective siloxane unit in the compound, wherein c is an integer in the range from 0 to 100 000 and wherein c' is an integer in the range from 3 to 100 000; and either b1) 90-99% by weight of at least one vinylsiloxane of general formula (IV)

  (IV), wherein the radicals $R^x$ are independently of one another selected from the group consisting of (i) unsubstituted or fluorinated $C_1$-$C_{20}$-hydrocarbon radical and (ii) phenyl radical and wherein the index c indicates the number of the respective siloxane unit in the compound and c=1001-100 000; or b2) 40-94% by weight of at least one vinylsiloxane of general formula (IIb')

  (IIb'), wherein the radicals $R^x$ are independently of one another selected from the group consisting of (i) unsubstituted or fluorinated $C_1$-$C_{20}$-hydrocarbon radical and (ii) phenyl radical and wherein the index c indicates the number of the respective siloxane unit in the compound and c=1-1000; and 0-50% by weight of at least one H-siloxane of general formula (IIa')

  (IIa'), wherein the radicals $R^x$ are independently of one another selected from the group consisting of (i) unsubstituted or fluorinated $C_1$-$C_{20}$-hydrocarbon radical and (ii) phenyl radical and wherein the index c indicates the number of the respective siloxane unit in the compound and c=1-100 000.

In this context the term hydrophobic silica is to be understood as meaning silica which is surface-silylated with at least one organosilicon compound selected from organosilanes of formula (IV) and organosilazanes of formula (V)

  (IV),

  (V), wherein the radicals $R^1$, $R^2$, $R^3$ are each independently selected from halogenated or unsubstituted $C_1$-$C_{24}$-hydrocarbon radicals; and
wherein the radical Y is selected from the group consisting of (i) halogen atom, (ii) —$OR^x$ and (iii) —OC(=O)$OR^x$, wherein $R^x$ is in each case selected from the group consisting of (i) hydrogen and (ii) substituted or unsubstituted $C_1$-$C_{24}$-hydrocarbon radical, wherein substituted is to be understood as meaning that at least one CH$_2$ group, but not the one bonded to silicon, may be replaced by —O—. As a result of the silylation the groups —O—SiR$^1$R$^2$R$^3$ are arranged on the surface of an originally hydrophilic silica, so that it is non-polar/hydrophobic. It is known from EP1433749 A1 how such silicas can be produced.

It is possible to employ only one hydrophobic silica or else mixtures of different hydrophobic silicas, wherein in the case of mixtures the silicas may differ in terms of properties, for example BET surface area, or else in terms of silylation. It is further possible for the silica to be silylated with one or more organosilicon compounds. The organosilicon compounds which may be used for silylation of the silicas may therefore also be mixtures of organosilanes and/or organosilazanes of formulae (IV) and (V).

It is preferable when the radicals $R^1$, $R^2$, $R^3$ in formulae (IV) and (V) are independently of one another selected from the group consisting of methyl radical, ethyl radical, propyl radical, 3,3,3-trifluoropropyl radical, octyl radical, phenyl radical and vinyl radical. It is particularly preferable when the radicals $R^1$, $R^2$, $R^3$ in formulae (IV) and (V) are independently of one another selected from the group consisting of methyl radical and vinyl radical.

The radicals $R^x$ are preferably selected from the group consisting of methyl radical, ethyl radical and propyl radical.

The radicals Y in formula (IV) are preferably selected from the group consisting of chlorine atom, methoxy radical, ethoxy radical and acetoxy radical.

Preferred examples of organosilicon compounds of formulae (IV) and (V) include
  alkylchlorsilanes, such as trimethylchlorosilane,
  methylmethoxysilanes, such as trimethylmethoxysilane,
  methylethoxysilanes, such as trimethylethoxysilane,
  methylacetoxysilanes, such as trimethylacetoxysilane,
  phenylsilanes, such as phenyldimethylchlorosilane, phenyldimethylmethoxysilane and phenyldimethylethoxysilane,
  vinylsilanes, such as vinyldimethylchlorosilane, vinyldimethylmethoxysilane and vinyldimethylethoxysilane,
  disilazanes such as hexamethyldisilazane, divinyltetramethyldisilazane and bis(3,3-trifluoropropyl)tetramethyldisilazane, and
  silanols such as trimethylsilanol and also
  mixtures thereof.

The silylation of the silica is preferably carried out using a silylation mixture of a trimethylsilane/hexamethyldisilazane and a vinylmethylsilane/bisvinyldimethyldisalazane, wherein the proportion of the vinylmethyl compound is in each case less than 50% by weight based on the total weight of the silylation mixture. The proportion of the vinylmethyl compound is preferably in a range from 0.1% to 20% by weight and particularly preferably in a range from 1% to 10% by weight in each case based on the total weight of the silylation mixture.

Particularly preferred for the silylation of the silica are organosilicon compounds selected from the group consisting of trimethylchlorosilane, trimethylmethoxysilane, vinyldimethylchlorosilane, vinyldimethylmethoxysilane, hexamethyldisilazane, bisvinyldimethyldisilazane and mixtures thereof. The organosilicon compound is very particularly preferably selected from (a) the group consisting of trimethylchlorosilane, trimethylmethoxysilane, vinyldimethylchlorosilane, vinyldimethylmethoxysilane, hexamethyldisilazane and bisvinyldimethyldisilazane; or (b) mixtures of trimethylchlorosilane or trimethylmethoxysilane or hexamethyldisilazane with vinylmethylchlorosilane or vinylmethylmethoxysilane or bisvinyldimethyldisilazane, wherein the proportion of the vinylmethyl compound is in each case less than 50% by weight based on the total weight of the mixture. The proportion of the vinyldimethyl compound is preferably in a range from 0.1% to 20% by weight and particularly preferably in a range from 1% to 10% by weight in each case based on the total weight of the silylation mixture.

The hydrophobic silica may be based on all silicas known to a person skilled in the art. It is customary to employ silicas produced by wet chemical methods, such as precipitated silicas, silica gels or colloidal silicas, or silicas produced in a high temperature process, so-called pyrogenic silicas.

The hydrophobic silica has an average particle size of <1000 nm (measured by photon correlation spectroscopy on suitably diluted aqueous solutions) and an average primary particle size in a range from 5 to 100 nm (determined by optical image analysis of TEM images). These primary particles do not exist in isolation but rather are components of larger aggregates and agglomerates.

The hydrophobic silica has a specific surface area in a range from 0.1 to 1000 $m^2/g$ (measured by the BET method according to DIN 66131 and 66132) and it is particularly preferable when the specific surface area is in a range from 10 to 500 $m^2/G$.

The hydrophobic silica comprises aggregates (definition according to DIN 53206) having diameters in the range from 100 to 1000 nm, wherein the hydrophobic silica further comprises agglomerates (definition according to DIN 53206) formed from aggregates which may have sizes in the range from 1 to 1000 μm according to the external shear stress (for example caused by the measurement conditions).

It is particularly preferable when the hydrophobic silica is based on pyrogenic silica. Pyrogenic silica is preferably produced in a flame-assisted reaction preferably from silicon-halogen compounds or organosilicon compounds, for example from silicon tetrachloride or methyldichlorosilane, or hydrogentrichlorosilane or hydrogenmethyldichlorosilane, or other methylchlorosilanes or alkylchlorosilanes, which may also be in a mixture with hydrocarbons, or any desired volatilizable or atomizable mixtures of organosilicon compounds, as mentioned, and hydrocarbons, for example in a hydrogen-oxygen flame or else a carbon monoxide-oxygen flame. The production of the pyrogenic silica may be carried out with or without further addition of water, for example in the step of purification, no addition of water is preferable.

The hydrophobic silica has a residual silanol content of less than 100% based on the silanol content of the unsilylated, i.e. hydrophilic, starting silica. The residual silanol content is preferably less than 75% and particularly preferably the residual silanol content is less than 50%, in each case based on the silanol content of the unsilylated, i.e. hydrophilic, starting silica. The silanol content is determined by acid-base titration as described in G. W. Sears, Anal. chem. 1956, 28, 1981 (cf. analytical methods in the analytical section).

The hydrophobic silica has a carbon content of ≥0.4% by weight of carbon, preferably in the range from 0.5% by weight to 15% by weight of carbon, in each case based on the weight of the hydrophobic silica. The carbon content is particularly preferably in a range from 0.75% by weight to 10% by weight of carbon based on the weight of the hydrophobic silica. The carbon content may be determined by elemental analysis (cf. analytical methods in the analytical section).

The hydrophobic silica has a methanol number of at least 30, preferably of at least 40 and particularly preferably of at least 50. The methanol number is the percentage of methanol that must be added to the water phase to achieve complete wetting of the silica. Complete wetting is to be understood as meaning complete sinking of the silica in the water-methanol test liquid (cf. analytical methods in the analytical section).

The hydrophobic silica has a DBP number (dibutyl phthalate number) of less than 250 g/100 g, preferably in a range from 150 g/100 g to 250 g/100 g. The DBP number may be determined according to DIN 53601 (cf. analytical methods in the analytical section).

The hydrophobic silica has a tamped density measured according to DIN EN ISO 787-11 in a range from 20 g/l to 500 g/l, preferably from 30 g/l to 200 g/l.

The hydrophobic silica typically has the following properties:
BET surface in the range of 0.1 to 1000 m²/g,
residual silanol content of <100%,
methanol number of at least 30,
DBP number of 250 g/100 g,
tamped density in the range from 20 to 500 g/l,
carbon content of ≥0.4% by weight of carbon.

The hydrophobic silica preferably has the following properties:
BET surface area in the range from 10 to 500 m²/g,
residual silanol content of <75%,
methanol number of at least 40,
DBP number in the range from 150 g/100 g to 250 g/100 g,
tamped density in the range from 30 to 200 g/l,
carbon content in the range from 0.5% to 15% by weight of carbon.

The hydrophobic silica particularly preferably has the following properties:
BET surface in the range of 100 to 400 m²/g,
residual silanol content of <50%,
methanol number of at least 50,
DBP number in the range from 150 g/100 g to 250 g/100 g,
tamped density in the range from 30 to 200 g/l,
carbon content in the range from 0.75% to 10% by weight of carbon.

Other fillers that may be employed include any commonly used auxiliaries and reinforcing fillers, for example quartz, diatomaceous earth, metal oxides such as aluminum oxide, zinc oxide, titanium oxide or zirconium oxide, metal silicates such as calcium silicate, carbonates such as calcium carbonate, sulfates such as calcium sulfate, color pigments and carbon blacks.

The present invention further provides a process for producing low-viscosity, electrically conductive, CNT-containing siloxanes, wherein the components a)-d) of the siloxane composition according to the invention are dispersed using a dissolver having a scraper.

The dispersing is carried out with a dissolver (high-speed mixer), wherein a scraper is typically also used to achieve a uniform distribution of the CNTs. It is preferable to employ a planetary dissolver having a scraper. It is particularly preferable to employ a vacuum planetary dissolver having a scraper and a cross-beam stirrer. Dissolver disks having any arrangement and number of teeth may be employed.

To effect dispersing the components a) to d) of the siloxane composition according to the invention may be added in any desired sequence and dispersed.

In a particular embodiment of the process (variant A) the required amount of siloxane is initially charged, and then first the CNTs and then the hydrophobic silica are mixed in and dispersed. The amount of siloxane, hydrophobic silica and CNTs may be calculated such that it corresponds to the desired solids contents of the hydrophobic silicas and CNTs in the finished mixture or a so-called masterbatch may also be produced. In the case of a masterbatch either the siloxane amount and/or the hydrophobic silica and CNT amount is calculated so as to result in a higher solids content in the mixture than is subsequently required. Once the dispersing is complete the concentrated solids dispersion may be diluted down to the solids target value with further siloxane. This can be done immediately after dispersing or later, optionally in a different mixing apparatus. Dilution may be effected using the same siloxane or a different siloxane of formula (I).

In a further particular embodiment of the process (variant B) first the required amount of siloxane is initially charged, and then first the hydrophobic silica and then the CNTs are mixed in and dispersed. The above-described masterbatch approach may optionally also be followed here.

In a further preferred embodiment of the process (variant C) hydrophobic silica and CNTs are mixed into the siloxane together and subsequently dispersed together. The above-described masterbatch approach may optionally also be followed here.

In a further preferred embodiment of the process (variant D) hydrophobic silica and CNTs are mixed into the siloxane and dispersed independently of one another, i.e. mixed in and dispersed in different mixing vessels, before the two mixtures are combined with mixing and, if necessary, further dispersing.

Variants B and C are particularly preferred, and variant C is very particularly preferred.

The addition of the components a) to d) may in each case be effected portion wise or by addition of the total amount independently of the precise process. Addition of the total amount is preferred in each case.

Prior to the actual dispersing it may be advantageous to stir or mix the solids into the siloxane at a lower rotational speed of the mixing tools. This makes it possible to achieve a corresponding pre-wetting of the solids with siloxane.

The mixing vessel and thus the mixture present therein may optionally be temperature controlled during the dispersing, i.e. maintained at a target temperature by cooling or heating. The temperature is typically in a range from 0-200° C., preferably in a range from 20-100° C.

The process according to the invention may optionally be performed under vacuum. The dispersing, i.e. dispersing intervals including dispersing pauses, is preferably carried out under vacuum. The vacuum is typically ≤1000 mbar, preferably ≤800 mbar and particularly preferred ≤500 mbar.

It may further be advantageous to apply a vacuum after the dispersing. This may be carried out in the same apparatus as the dispersing or in a different apparatus. A vacuum is typically applied with stirring. The vacuum is typically ≤1000 mbar, preferably ≤800 mbar and particularly preferred ≤500 mbar.

The dispersing is preferably carried out at the power maximum of the dissolver and at least one dispersing pause in the range from 1 minute to 60 minutes is taken, wherein the power maximum is determined by increasing the dissolver speed by 250 rpm every 5 minutes and evaluating the dispersing power against the speed of the dissolver, thus allowing determination of an optimal rotational speed of the dissolver for the specific power maximum. This makes it possible to achieve much better values for the conductivity of the material.

The dispersing is then carried out at a high rotational speed of the dispersing tools and especially of the dissolver disk. The high power input thus achieved results in the desired finely dispersed distribution of the CNTs in the siloxane. A maximum power input of the mixing tools is essential to the dispersion result, and thus to an optimally high electrical conductivity of the CNT-siloxane mixture.

The maximum power input depends on the selected mixing tools, their geometric arrangement, the rotational speed, in particular of the dissolver disk, the temperature and the effective viscosity of the mixture, i.e. the viscosity of the siloxane which depends inter alia on the degree of polymerization of the siloxane and the CNT amount added. The multiplicity of influencing parameters on power input necessitates one-time experimental determination of the maximum power input for the given mixing apparatus and the desired CNT-siloxane mixture. To this end, the mixture is provided in the desired composition and amount and the rotational speed of the dispersing tool is then increased stepwise, i.e. in stages (for example by 250 rpm every minute). The power input is recorded for each stage. This may be done, for example, by measuring the torque of the dispersing shaft, for example using strain gauges or other customary measuring means or by measuring the power consumption of the dispersing motor using commercially available power meters (wattmeters).

The range of maximum power input is a function of the rotational speed of the dispersing tool and may be readily read off the resulting curve. The rotational speed of the dispersing means at the power maximum typically does not correspond to the maximum technically possible rotational speed of the dispersing tool.

The dispersing is interrupted by at least one dispersing pause. In this context a dispersing pause is to be understood as meaning that the dispersing tool (dissolver disk) is stopped. Other mixing tools present having a low power input, for example crossbeam stirrers, may optionally still be run. It is preferable to stop all mixing tools so that the mechanical power input during the dispersing pause is zero. It is preferable to take 1-10 dispersing pauses, particularly preferably 1-5 dispersing pauses, very particularly preferably only one dispersing pause.

The duration of the dispersing pauses is ≥1 minute in each case. For reasons of space-time yield, the duration of the dispersing pauses is preferably in a range from 1 minute to 60 minutes. The duration of the dispersing pauses is particularly preferably in a range from 5 minutes to 45 minutes, very particularly preferably in the range from 5 minutes to 30 minutes.

The juncture of the dispersing pauses may be chosen at will during the dispersing, for example in regular or arbitrary intervals. Regular intervals are preferred.

The duration of the dispersing intervals between the dispersing pauses is in the range from 1 minute to 300 minutes. The duration of the dispersing intervals is preferably in the range from 1 minute to 120 minutes, particularly preferably in the range from 5 minutes to 60 minutes, very particularly preferably in the range from 5 minutes to 30 minutes.

In the context of this patent the sum of the dispersing intervals without dispersing pauses, i.e. purely the dispersing time, is defined as the total dispersing time. This is to be understood as meaning for example that in the case of three 10 minute dispersing intervals, each interrupted by a 30-minute dispersing pause, the total dispersing time is 30 minutes.

For reasons of space-time yield and to avoid possible mechanical damage to the CNTs it is advantageous to keep the total dispersing time as short as possible.

The siloxane composition according to the invention may optionally contain other fillers in addition to the hydrophobic silica and the CNTs. These may be mixed in together with the hydrophobic silica/the CNT according to the abovementioned embodiments (variants A to D) or independently of the hydrophobic silicas/the CNTs. An independent addition, i.e. in a separate process step, is preferred.

It is preferable when the other fillers of the siloxane composition are mixed in following the mixing-in of hydrophobic silica and CNT. The mixing-in may be carried out with input of great shear energy as described above or by simple stirring in without input of shear, for example via a slow-running dispersing disk or a customary stirrer such as for example a crossbeam stirrer or an anchor stirrer. Mixing-in by means of a stirrer is preferred.

The present invention further provides for the use of the inventive siloxane composition according to the second preferred embodiment as a formative material in 3D printing or screen printing.

The present invention further provides an elastic, electrically conductive shaped article obtainable by a process comprising the steps of:
a) producing a siloxane composition according to the second preferred embodiment,
b) reacting this siloxane composition with a hydrosilylation catalyst, and
c) forming.

The hydrosilylation catalyst employed may be any catalyst known to a person skilled in the art. It is customary to use Pt(0) catalysts, such as Karstedt's catalyst. The amount of catalyst is freely choosable by a person skilled in the art. It is customary to employ 1 to 1000 ppm of Pt.

The remaining reaction conditions such as pressure, temperature and molar ratio in the hydrosilylation are freely choosable by a person skilled in the art.

EXAMPLES

Chemicals:
CNTs LUCAN BT1001M, LG Chem Ltd., average diameter according to manufacturer specifications: 5 nm ViPo 1000: vinyldimethylsiloxy-terminated polydimethylsiloxane having a viscosity of 1000 mPa*s obtainable from Gelest Inc., product designation DMS-V31 (Gelest catalogue)

ViPo 20000: vinyldimethylsiloxy-terminated polydimethylsiloxane having a viscosity of 20,000 mPa*s obtainable from Gelest Inc., product designation DMS-V42 (Gelest catalogue)

HPo 1000: hydridodimethylsiloxy-terminated polydimethylsiloxane having a viscosity of 1000 mPa*s obtainable from Gelest Inc., product designation DMS-H31 (Gelest catalogue)

Hydrophobic silica A: pyrogenic silica having trimethylsiloxy groups, BET surface area: 187 $m^2/g$, carbon content: 4.5% by weight, methanol number: 72%, residual silanol content: 25%, DBP number: 161 g/100 g, tamped density: 150 g/ml.

Hydrophobic silica B: pyrogenic silica having trimethylsiloxy groups, BET surface area: 89 $m^2/g$, carbon content: 1.9% by weight, methanol number: 78%, residual silanol content: 30%, DBP number: 153 g/100 g, tamped density: 135 g/ml.

Hydrophobic silica HDK® 18: pyrogenic silica having dimethylsiloxy groups, BET surface area: 132 $m^2/g$, carbon content: 4.7% by weight, methanol number: 79%, residual silanol content: 21%, DBP number: 165 g/100 g, tamped density: 52 g/ml (obtainable from WACKER Chemie AG).

Analytical Methods for Characterization of the Silicas

Methanol Number:
Test of wettability with water-methanol mixtures (% by volume MeOH in water): Shake in an equal volume of the silica with an equal volume of a water-methanol mixture start with 0% by volume of methanol
  in case of non-wetting at least part of the silica floats: A mixture having an MeOH content 5% by volume higher is to be used
  in case of wetting the entire volume of the silica sinks: Proportion of MeOH (% by volume) in water gives the methanol number.

Carbon Content (% C):

The elemental analysis for carbon was carried out according to DIN ISO 10694 using a CS-530 elemental analyzer from Eltra GmbH (D-41469 Neuss).

Residual Silanol Content:

Determination of residual silanol content was carried out analogously to G. W. Sears et al. (Analytical Chemistry 1956, 28, 1981ff) by acid-base titration of the silica suspended in a 1:1 mixture of water and methanol. The titration was carried out in the range above the isoelectric point and below the pH range of dissolution of the silicic acid. The residual silanol content in % can then be calculated using the following formula:

% SiOH=SiOH(silyl)/SiOH(phil)*100, where
SiOH(phil): titration volume from titration of the untreated silica
SiOH(silyl): titration volume from titration of the silylated silica DBP Number:

The dibutyl phthalate absorption is measured using a RHEOCORD 90 instrument from Haake, Karlsruhe in accordance with DIN 53601. To this end, 12 g±0.001 g of the silicon dioxide powder are charged into a kneading chamber, the latter is sealed with a lid and dibutyl phthalate is metered in at a predetermined metering addition rate of 0.0667 ml/s via a hole in the lid. The kneader is operated at a motor speed of 125 revolutions per minute. After reaching the torque maximum, the kneader and the DBP metered addition are switched off automatically. The consumed amount of DBP and the amount of particles weighed in are used to calculate the DBP absorption according to: DBP number (g/100 g)=(consumption of DBP in g/weight of powder in g)×100.

Tamped Density:

Tamped density is measured according to DIN EN ISO 787-11.

Viscosity Measurement:

Viscosity measurements were performed in an air-bearing MCR 302 rheometer from Anton Paar at 25° C. A cone and plate system (25 mm, 2°) having a gap width of 105 µm was used. The excess material was removed (trimmed) with a spatula at a gap width of 115 µm. The cone then moved to a gap width of 105 µm to fill the entire gap. Before each measurement, a pre-shear is performed to erase the shear history resulting from sample preparation, application and trimming. The pre-shear is carried out for 60 seconds at a shear rate of 10 s$^{-1}$, followed by a rest period of 300 seconds. Shear viscosity is determined using a step profile in which the sample is sheared at a constant shear rate of 1 s$^{-1}$, 10 s$^{-1}$ and 100 s$^{-1}$ for 100 seconds in each case. A reading is recorded every 10 seconds, resulting in 10 data points per shear rate. The average of these 10 data points gives the shear viscosity at the respective shear rate.

Resistance Measurement:

A four-conductor measurement does not measure the contact resistance since the current is applied at two contacts and it is the voltage U of the current that has already flowed through the sample $I_U$ that is measured.

$$R = \frac{U}{I_U}$$

$[\Omega]$

The resistance R of unvulcanized siloxanes is measured with a multimeter model 2110 5½ digit from Keithley Instrument and a fabricated measuring apparatus made of pure PP and stainless steel (1.4571) electrodes. The measuring instrument is connected to the electrodes by means of brass contacts and laboratory leads. The measuring apparatus is a mold with defined dimensions of L×W×H of 16 cm×3 cm×0.975 cm, into which the siloxane is poured for measurement. The two outer flat electrodes are attached at a distance of 16 cm, thus ensuring the current flows through the entire sample. The two-point electrodes having a diameter of 1 cm are arranged in the base plate at a distance of 12 cm (l) and measure the voltage. The specific resistance is calculated from the measured resistance R using the following formula.

$$\rho = \frac{R \cdot h \cdot w}{l}$$

$[\Omega\ cm]$, with sample height h [cm], sample width w [cm] and electrode distance l [cm](here: h=0.975 cm, w=3 cm, l=12 cm)

A sample is described as good if it has a specific resistance of <20 $\Omega$*cm based on 1% by weight of CNT in each case.

Measurement of Relaxation:

Oscillation-Rotation-Oscillation (ORO) Test:

In the first stage the resting structure is measured over 300 seconds (one reading every 10 seconds) at constant deformation and angular frequency ($\gamma$=0.1%, $\omega$=10 Hz). This is followed by the loading phase in rotation for 0.5 seconds with a shear rate of $\dot\gamma$=100 s$^{-1}$, which ends with a 0.05 second pause to stop the cone of the viscometer (air-bearing MCR 302 rheometer from Anton Paar). In the last stage of 19.6 minutes (300 readings recorded logarithmically from 1-10 seconds), the same parameters as in the first stage ($\gamma$=0.1%, $\omega$=10 Hz) are used to observe structure formation.

| | 300 Sec (30 × 10 sec) | 0.5 Sec | 0.05 Sec pause | 19.6 Min (300 × 1-10 sec) |
|---|---|---|---|---|
| $\gamma$ | 0.1% | — | — | 0.1% |
| $\omega$ | 10 Hz | — | — | 10 Hz |
| $\dot\gamma$ | — | 100 s$^{-1}$ | — | — |

Mixing Method:

The mixtures were produced in a Labotop 1 LA from PC Laborsystem GmbH of 1 liter in capacity at a vacuum of 300 mbar and room temperature. The tools employed were a dissolver disk (14 teeth, teeth at 90° to disk, diameter 52 cm), a cross-beam stirrer (standard tool) and a scraper with temperature measurement. The mixtures are mixed at the highest possible power and the power can be read off on the device. In the case of this mixing process, the highest power of 1900 watts is achieved in the range from 500 rpm to 1400 rpm. The selected speed of 1250 rpm results in a rotational speed of 3.4 m/s.

In the case of dissolvers without an integrated power display, the power may be determined using a power meter (wattmeter).

Example 1

In a laboratory mixer from VMA-Getzmann GmbH fitted with a Zahn dissolver disk (diameter 40 mm), 1% by weight of CNT (1 g) was mixed into a mixture of ViPo 1000 (38% by weight), HPo 1000 (39% by weight) and 22% by weight of silica A for 15 minutes at room temperature and 6000 rpm (12.57 m/s) under vacuum (300 mbar) (total mass: 100 g). A homogeneous, black paste having a specific resistance of 11 Ω*cm was obtained. After 60 seconds of relaxation, the structural relaxation shows 74.9% of the storage modulus based on the plateau value of the storage modulus after 20 minutes. The viscosity is 529 000 mPa*s at a shear rate of 1 s$^{-1}$ and 97 200 mPa*s at a shear rate of 10 s$^{-1}$.

Good relaxation coupled with good viscosity values and good conductivity is obtained.

Example 2

In a laboratory mixer from VMA-Getzmann GmbH fitted with a Zahn dissolver disk (diameter 40 mm), 0.5% by weight of CNT (1 g) was mixed into a mixture of ViPo 1000 (38% by weight), HPo 1000 (39% by weight) and 22% by weight of silica A for 6 minutes at room temperature and 6000 rpm (12.57 m/s) under vacuum (300 mbar) (total mass: 100 g). A homogeneous, black paste having a specific resistance of 35 Ω*cm was obtained. After 60 seconds of relaxation, the structural relaxation shows 76.4% of the storage modulus based on the plateau value of the storage modulus after 20 minutes. The viscosity is 173 000 mPa*s at a shear rate of 1 s$^{-1}$ and 43 400 mPa*s at a shear rate of 10 s$^{-1}$.

Good relaxation coupled with good viscosity values and acceptable conductivity is obtained.

Example 3

In a laboratory mixer from VMA-Getzmann GmbH fitted with a Zahn dissolver disk (diameter 40 mm), a 100 g mixture of 1% by weight of CNT and 5% by weight of silica A in ViPo 20,000 was produced for 15 minutes at room temperature and 3000 rpm (6.28 m/s) under vacuum (300 mbar). A homogeneous, black paste having a specific resistance of 17 Ω*cm was obtained. The structural relaxation shows a cross-over from G">G' to G"<G' after 2.6 seconds of recovery and after 60 seconds of relaxation achieves 72.2% of the storage modulus based on the plateau value of the storage modulus after 20 minutes. The viscosity is 371,000 mPa*s at a shear rate of 1 s$^{-1}$ and 94,300 at a shear rate of 10 s$^{-1}$.

Good relaxation coupled with good viscosity values and good conductivity is obtained.

Example 4

In a laboratory mixer from VMA-Getzmann GmbH fitted with a Zahn dissolver disc (diameter 40 mm), a 100 g mixture of 1% by weight of CNT and 10% by weight of silica A in ViPo 20,000 (38% by weight) was produced for 15 minutes at room temperature and 3000 rpm (6.28 m/s) under vacuum (300 mbar). A homogeneous, black paste having a specific resistance of 24 Ω*cm was obtained. The structural relaxation shows a cross-over from G">G' to G"<G' after 2.5 seconds of recovery and after 60 seconds of relaxation achieves 72.9% of the storage modulus based on the plateau value of the storage modulus after 20 minutes. The viscosity is 487,000 mPa*s at a shear rate of 1 s$^{-1}$ and 125,000 at a shear rate of 10 s$^{-1}$.

Good relaxation coupled with good viscosity values and acceptable conductivity is obtained.

Example 5

In a laboratory mixer from VMA-Getzmann GmbH fitted with a Zahn dissolver disc (diameter 40 mm), a 100 g mixture of 1% by weight of CNT and 15% by weight of silica A in ViPo 20,000 (38% by weight) was produced for 15 minutes at room temperature and 3000 rpm (6.28 m/s) under vacuum (300 mbar). A homogeneous, black paste having a specific resistance of 33 Ω*cm was obtained. The structural relaxation shows a cross-over from G">G' to G"<G' after 2.4 seconds of recovery and after 60 seconds of relaxation achieves 70.1% of the storage modulus based on the plateau value of the storage modulus after 20 minutes. The viscosity is 598 000 mPa*s at a shear rate of 1 s$^{-1}$ and 154 000 at a shear rate of 10 s$^{-1}$.

Good relaxation coupled with good viscosity values and acceptable conductivity is obtained.

Example 6

In a laboratory mixer from VMA-Getzmann GmbH fitted with a Zahn dissolver disc (diameter 40 mm), a 100 g mixture of 1% by weight of CNT and 20% by weight of silica A in ViPo 20,000 (38% by weight) was produced for 15 minutes at room temperature and 3000 rpm (6.28 m/s) under vacuum (300 mbar). A homogeneous, black paste having a specific resistance of 61 Ω*cm was obtained. The structural relaxation shows a cross-over from G">G' to G"<G' after 2.4 seconds of recovery and after 60 seconds of relaxation achieves 65.5% of the storage modulus based on the plateau value of the storage modulus after 20 min. The viscosity is 758 000 mPa*s at a shear rate of 1 s$^{-1}$ and 206 000 at a shear rate of 10 s$^{-1}$.

Good relaxation coupled with good viscosity values and acceptable conductivity is obtained.

Example 7

In a laboratory mixer from VMA-Getzmann GmbH fitted with a Zahn dissolver disk (diameter 40 mm), a 100 g mixture of 10% by weight of silica A in ViPo 20,000 was produced for 1 hour at room temperature and 6000 rpm (12.57 m/s) under vacuum (300 mbar). Subsequently, 1% by weight of CNT were mixed in for 15 minutes at room temperature and 3000 rpm (6.28 m/s) under vacuum (300 mbar). A homogeneous, black paste having a specific resistance of 19 Ω*cm was obtained. The structural relaxation shows a cross-over from G">G' to G"<G' after 2.4 seconds of recovery and after 60 seconds of relaxation achieves 70.8% of the storage modulus based on the plateau value of the storage modulus after 20 minutes. The viscosity is 492 000 mPa*s at a shear rate of 1 s$^{-1}$ and 128 000 at a shear rate of 10 s$^{-1}$.

Good relaxation coupled with good viscosity values and acceptable conductivity is obtained.

Example 8 (Noninventive)

In a laboratory mixer from VMA-Getzmann GmbH fitted with a Zahn dissolver disk (diameter 40 mm), a 100 g mixture of 1% by weight of CNT in ViPo 20,000 was mixed for 15 minutes at room temperature and 6000 rpm (12.57 m/s) under vacuum. A homogeneous, black paste having a specific resistance of 6 Ω*cm was obtained. It shows no cross-over in the structural relaxation since G' immediately after the loading phase is greater than G". The structural relaxation achieves 86.3% of the storage modulus after 60 seconds based on the plateau value of the storage modulus after 20 minutes. The viscosity is 456 000 mPa*s at a shear rate of 1 s$^{-1}$ and 108 000 mPa*s at a shear rate of 10 s$^{-1}$.

Poor relaxation coupled with good viscosity values and good conductivity are obtained.

Example 9

In a planetary mixer from PC Laborsystem GmbH fitted with a crossbeam stirrer, dissolver (disk diameter 52 mm) and scraper a 500 g mixture consisting of 1% by weight of CNT and 5% by weight of silica A in ViPo 20,000 was mixed 3 times for 5 minutes at room temperature under vacuum at 1250 rpm with respective 30-minute pauses between the dispersing intervals. After a total dispersing time of 15 minutes (5 minutes of dispersing, 30-minute pause, 5 minutes of dispersing etc.) a homogeneous, black paste having a specific resistance of 11 Ω*cm was obtained. The structural relaxation shows a cross-over from G">G' to G"<G' after 2.9 seconds of recovery and after 60 seconds of relaxation achieves 70.3% of the storage modulus based on the plateau value of the storage modulus after 20 minutes. The viscosity is 383 000 mPa*s at a shear rate of 1 s$^{-1}$ and 99 600 at a shear rate of 10 s$^{-1}$.

Good relaxation coupled with good viscosity values and good conductivity is obtained.

Example 10

In a planetary mixer from PC Laborsystem GmbH fitted with a crossbeam stirrer, dissolver (disk diameter 52 mm) and scraper a 500 g mixture consisting of 1% by weight of CNT and 10% by weight of silica A in ViPo 20,000 was mixed 3 times for 5 minutes at room temperature under vacuum at 1250 rpm with respective 30-minute pauses between the dispersing intervals. After a total dispersing time of 15 minutes (5 minutes of dispersing, 30-minute pause, 5 minutes of dispersing etc.) a homogeneous, black paste having a specific resistance of 12 Ω*cm was obtained. The structural relaxation shows a cross-over from G">G' to G"<G' after 2.7 seconds of recovery and after 60 seconds of relaxation achieves 71.0% of the storage modulus based on the plateau value of the storage modulus after 20 minutes. The viscosity is 498 000 mPa*s at a shear rate of 1 s$^{-1}$ and 133 000 at a shear rate of 10 s$^{-1}$.

Good relaxation coupled with good viscosity values and good conductivity is obtained.

Example 11

In a planetary mixer from PC Laborsystem GmbH fitted with a crossbeam stirrer, dissolver (disk diameter 52 mm) and scraper a 500 g mixture consisting of 1% by weight of CNT and 10% by weight of silica B in ViPo 1000 was mixed 3 times for 5 minutes at room temperature under vacuum at 250 rpm with respective 30-minute pauses between the dispersing intervals. After a total dispersing time of 15 minutes (5 minutes of dispersing, 30-minute pause, 5 minutes of dispersing etc.) a homogeneous, black paste having a specific resistance of 16 Ω*cm was obtained. After 60 seconds of relaxation, the structural relaxation shows 75.2% of the storage modulus based on the plateau value of the storage modulus after 20 minutes. The viscosity is 190 000 mPa*s at a shear rate of 1 s$^{-1}$ and 29 012.8 mPa*s at a shear rate of 10 s$^{-1}$.

Good relaxation coupled with good viscosity values and good conductivity is obtained.

Example 12

In a planetary mixer from PC Laborsystem GmbH fitted with a crossbeam stirrer, dissolver (disk diameter 52 mm) and scraper a 500 g mixture consisting of 1% by weight of CNT and 10% by weight of silica B in ViPo 1000 was mixed in for 10 minutes without interruption at room temperature under vacuum at 1250 rpm. A homogeneous, black paste having a specific resistance of 46 Ω*cm after 15 minutes of pure dispersing time was obtained. After 60 seconds of relaxation, the structural relaxation shows 77.8% of the storage modulus based on the plateau value of the storage modulus after 20 minutes. The viscosity is 172 000 mPa*s at a shear rate of 1 s$^{-1}$ and 16 988.6 mPa*s at a shear rate of 10 s$^{-1}$.

Good relaxation coupled with good viscosity values and acceptable conductivity is obtained.

Example 13 (Noninventive, Dimethylsiloxy Modification as Comparison to CN107298859)

In a planetary mixer from PC Laborsystem GmbH fitted with a crossbeam stirrer, dissolver (disk diameter 52 mm) and scraper a 500 g mixture consisting of 1% by weight of CNT and 10% by weight of silica HDK® H18 in ViPo 20,000 was mixed 3 times for 5 minutes at room temperature under vacuum at 1,250 rpm with respective 30-minute pauses between the dispersing intervals. After a total dispersing time of 15 minutes (5 minutes of dispersing, 30-minute pause, 5 minutes of dispersing etc.) a homogeneous, black paste having a specific resistance of 26 Ω*cm was obtained. After 60 seconds of relaxation, the structural relaxation achieves 76.7% of the storage modulus based on the plateau value of the storage modulus after 20 minutes. The viscosity is 1,120,000 mPa*s at a shear rate of 1 s$^{-1}$ and 254,000 mPa*s at a shear rate of 10 s$^{-1}$.

Although the relaxation has a good value, undesirable high viscosities (>1,000,000 mPa*s) occur when using the dimethylsiloxy-modified silica. The mixture is also inhomogeneous due to incompatibilities.

| Example | Siloxane(s) | CNTs [% by wt] | Silica | Resistance [Ω * cm] | Relaxation after 60 seconds [%] | Shear rate 1 s-1 [mPa * s] | Shear rate 10 s-1 [mPa * s] |
|---|---|---|---|---|---|---|---|
| 1 | ViPo 1000 (38% by | 1 | A, 22% by weight | 11 | 74.9 | 529 000 | 97 200 |

-continued

| Example | Siloxane(s) | CNTs [% by wt] | Silica | Resistance [Ω * cm] | Relaxation after 60 seconds [%] | Shear rate 1 s-1 [mPa * s) | Shear rate 10 s-1 [mPa * s] |
|---|---|---|---|---|---|---|---|
| | weight) HPo 1000 (39% by weight) | | | | | | |
| 2 | ViPo 1000 (38% by weight) HPo 1000 (39% by weight) | 0.5 | A, 22% by weight | 35 | 76.4 | 173 000 | 43 400 |
| 3 | ViPo 20 000 | 1 | A, 5% by weight | 17 | 72.2 | 371 000 | 94 300 |
| 4 | ViPo 20 000 | 1 | A, 10% by weight | 24 | 72.9 | 487 000 | 125 000 |
| 5 | ViPo 20 000 | 1 | A, 15% by weight | 33 | 70.1 | 598 000 | 154 000 |
| 6 | ViPo 20 000 | 1 | A, 20% by weight | 61 | 65.5 | 758 000 | 205 000 |
| 7 | ViPo 20 000 | 1 | A, 10% by weight | 19 | 70.8 | 492 000 | 128 000 |
| 8 (CE) | ViPo 20 000 | 1 | none | 6 | 86.3 | 456 000 | 108 000 |
| 9 | ViPo 20 000 | 1 | A, 5% by weight | 11 | 70.3 | 383 000 | 99 600 |
| 10 | ViPo 20 000 | 1 | A, 10% by weight | 12 | 71.0 | 498 000 | 133 000 |
| 11 | ViPo 1000 | 1 | B, 10% by weight | 16 | 75.2 | 190 000 | 29 013 |
| 12 | ViPo 1000 | 1 | B, 10% by weight | 46 | 77.8 | 172 000 | 16 989 |
| 13 (CE) | ViPo 20000 | 1 | HDK ® H18, 10% by weight | 26 | 76.7 | 1 120 000 | 254 000 |

The invention claimed is:

1. An electrically conductive, CNT-containing siloxane composition, comprising:
   a) 0.1-5% by weight of carbon nanotubes (CNTs);
   b) 70-97.9% by weight of at least one siloxane selected from compounds of general formula (I)

$(SiO_{4/2})_a(R^xSiO_{3/2})_b(R^x_2SiO_{2/2})_c(R^x_3SiO_{1/2})_d$  (I), wherein the radicals $R^x$ are independently of one another selected from the group consisting of (i) hydrogen, (ii) —CH=CH$_2$, (iii) unsubstituted or fluorinated C$_1$-C$_{20}$-hydrocarbon radical, (iv) phenyl radical and (v) —OH and wherein the indices a, b, c and d indicate the number of the respective siloxane unit in the compound and independently of one another represent an integer in the range from 0 to 100 000, wherein a+b+c+d≥2;
   c) 1-20% by weight of at least one hydrophobic silica which is surface-silylated with at least one organosilicon compound selected from organosilanes of formula (IV) and organosilazanes of formula (V)

$R^1R^2R^3Si$—Y  (IV), $R^1R^2R^3Si$—NH—$SiR^1R^2R^3$  (V), wherein the radicals $R^1, R^2, R^3$ are each independently selected from halogenated or unsubstituted C$_1$-C$_{24}$-hydrocarbon radicals;
   wherein the radical Y is selected from the group consisting of (i) halogen atom, (ii) —OR$^x$ and (iii) —OC(=O)OR$^x$, wherein R$^x$ is in each case selected from the group consisting of (i) hydrogen and (ii) substituted or unsubstituted C$_1$-C$_{24}$-hydrocarbon radical, wherein substituted is to be understood as meaning that at least one CH$_2$ group, but not the one bonded to silicon, may be replaced by —O—; and
   d) 0-5% by weight of other fillers;
   wherein the proportions are based on the total weight of the composition and the components a) to d) sum to 100% by weight; and
   wherein the composition has a specific resistance of <20 Ω*cm based on 1% by weight of CNT.

2. The composition of claim 1, wherein the CNTs are multi-walled carbon nanotubes (MWCNTs).

3. The composition of claim 1, wherein the siloxane is a siloxane mixture comprising:
   a) at least one H-siloxane selected from compounds of general formula (IIa)

$(R^x_2SiO_{2/2})_c(HR^xSiO_{2/2})_{c'}(R^x_3SiO_{1/2})_d(HR^x_2SiO_{1/2})_{d'}$,  (IIa), wherein the radicals $R^x$ are independently of one another selected from the group consisting of (i) unsubstituted or fluorinated C$_1$-C$_{20}$-hydrocarbon radical and (ii) phenyl radical and wherein the indices c, c', d and d' indicate the number of the respective siloxane unit in the compound;
   wherein c and c' each represent an integer in the range from 0 to 100 000;
   wherein d and d' may each assume the value 0 or 1 or 2;
   wherein the sum of d and d' is 2; and
   b) at least one vinylsiloxane selected from compounds of general formula (IIb)

$(R^x_2SiO_{2/2})_c(ViR^xSiO_{2/2})_{c'}(ViR^x_2SiO_{1/2})_2$  (IIb), wherein the radicals Vi each represent a —CH=CH$_2$ group bonded to the silicon atom;
   wherein the radicals $R^x$ are independently of one another selected from the group consisting of (i) unsubstituted or fluorinated C$_1$-C$_{20}$-hydrocarbon radical and (ii) phenyl radical; and
   wherein the indices c and c' indicate the number of the respective siloxane unit in the compound, and c and c' each represent an integer in the range from 0 to 100 000.

4. The composition of claim 1, wherein the siloxane is a siloxane mixture comprising:
   a) 1-10% by weight of at least one H-siloxane of general formula (III) as a crosslinker $(R^x_2SiO_{2/2})_c(HR^xSiO_{2/2})_{c'}(R^x_3SiO_{1/2})_2$  (III), wherein the radicals $R^x$ are independently of one another selected from the group consisting of (i) unsubstituted or fluorinated C$_1$-C$_{20}$-hydrocarbon radical and (ii) phenyl radical;

wherein the indices c and c' indicate the number of the respective siloxane unit in the compound;
wherein c is an integer in the range from 0 to 100 000;
wherein c' is an integer in the range from 3 to 100 000; and either b1) 90-99% by weight of at least one vinylsiloxane of general formula (IV)

$(R^x{}_2SiO_{2/2})_c(ViR^x{}_2SiO_{1/2})_2$ (IV), wherein the radicals $R^x$ are independently of one another selected from the group consisting of (i) unsubstituted or fluorinated $C_1$-$C_{20}$-hydrocarbon radical and (ii) phenyl radical;
wherein the index c indicates the number of the respective siloxane unit in the compound and c=1001-100 000; or b2) 40-94% by weight of at least one vinylsiloxane of general formula (IIb')

$(R^x{}_2SiO_{2/2})_c(ViR^x{}_2SiO_{1/2})_2$ (IIb'), wherein the radicals $R^x$ are independently of one another selected from the group consisting of (i) unsubstituted or fluorinated $C_1$-$C_{20}$-hydrocarbon radical and (ii) phenyl radical;
wherein the index c indicates the number of the respective siloxane unit in the compound and c=1-1000; and 0-50% by weight of at least one H-siloxane of general formula (IIa')

$(R^x{}_2SiO_{2/2})_c(HR^x{}_2SiO_{1/2})_2$ (IIa'), wherein the radicals $R^x$ are independently of one another selected from the group consisting of (i) unsubstituted or fluorinated $C_1$-$C_{20}$-hydrocarbon radical and (ii) phenyl radical; and
wherein the index c indicates the number of the respective siloxane unit in the compound and c=1-100 000.

5. The composition of claim 1, wherein the radicals $R^1$, $R^2$, $R^3$ in formulae (IV) and (V) are each independently of one another selected from the group consisting of methyl radical, ethyl radical, propyl radical, 3,3,3-trifluoropropyl radical, octyl radical, phenyl radical and vinyl radical.

6. The composition of claim 1, wherein the organosilicon compound is selected from the group consisting of trimethylchlorosilane, trimethylmethoxysilane, vinyldimethylchlorosilane, vinyldimethylmethoxysilane, hexamethyldisilazane, bisvinyldimethyldisilazane and mixtures thereof.

7. The composition of claim 1, wherein the hydrophobic silica has the following properties
a BET surface in the range of 0.1 to 1,000 m²/g;
a residual silanol content of <100%;
a methanol number of at least 30;
a DBP number of ≤250 g/100 g;
a tamped density in the range from 20 to 500 g/l; and
a carbon content in the range of ≥0.4% by weight.

8. The composition of claim 7, wherein the hydrophobic silica is based on a pyrogenic silica.

9. The composition of claim 1, wherein the other filler is selected from quartz, diatomaceous earth, metal oxides such as aluminum oxides, zinc oxides, titanium oxides or zirconium oxides, metal silicates such as calcium silicate, carbonates such as calcium carbonate, sulfates such as calcium sulfate, color pigments and carbon blacks.

10. The composition of claim 1, wherein the composition is used as a formative material in 3D printing or screen printing.

11. The composition of claim 1, wherein the composition has a low-viscosity of ≤1,000,000 mPa*s at a shear rate of 1 s−1, measured at a temperature of 25° C.

12. The composition of claim 1, wherein the hydrophobic silica has a residual silanol content of less than 50%.

13. A process for producing an electrically conductive, CNT-containing siloxane compositions, comprising the steps of:
providing a siloxane composition, wherein the siloxane composition comprises
a) 0.1-5% by weight of CNTs;
b) 70-97.9% by weight of at least one siloxane selected from compounds of general formula (I)

$(SiO_{4/2})_a(R^xSiO_{3/2})_b(R^x{}_2SiO_{2/2})_c(R^x{}_3SiO_{1/2})_d$ (I), wherein the radicals $R^x$ are independently of one another selected from the group consisting of (i) hydrogen, (ii) —CH=CH$_2$, (iii) unsubstituted or fluorinated $C_1$-$C_{20}$-hydrocarbon radical, (iv) phenyl radical and (v) —OH and wherein the indices a, b, c and d indicate the number of the respective siloxane unit in the compound and independently of one another represent an integer in the range from 0 to 100 000, wherein a+b+c+d≥2;

c) 1-20% by weight of at least one hydrophobic silica which is surface-silylated with at least one organosilicon compound selected from organosilanes of formula (IV) and organosilazanes of formula (V)

$R^1R^2R^3Si—Y$ (IV), $R^1R^2R^3Si—NH—SiR^1R^2R^3$ (V), wherein the radicals $R^1,R^2,R^3$ are each independently selected from halogenated or unsubstituted $C_1$-$C_{24}$-hydrocarbon radicals;
wherein the radical Y is selected from the group consisting of (i) halogen atom, (ii) —OR$^x$ and (iii) —OC(=O)OR$^x$, wherein $R^x$ is in each case selected from the group consisting of (i) hydrogen and (ii) substituted or unsubstituted $C_1$-$C_{24}$-hydrocarbon radical, wherein substituted is to be understood as meaning that at least one CH$_2$ group, but not the one bonded to silicon, may be replaced by —O—; and
d) 0-5% by weight of other fillers;
wherein the proportions are based on the total weight of the composition and the components a) to d) sum to 100% by weight;
wherein the composition has a specific resistance of <20 Ω*cm based on 1% by weight of CNT; and
dispersing the siloxane composition using a dissolver having a scraper.

14. The process of claim 13, wherein two or more dispersing pauses are taken at regular intervals; or
wherein the duration of the dispersing intervals between the dispersing pauses is in a range from 1 minute to 60 minutes.

15. The process of claim 13, wherein the dissolver is a planetary dissolver.

16. The process of claim 13, wherein the composition has a low-viscosity of ≤1,000,000 mPa*s at a shear rate of 1 s−1, measured at a temperature of 25° C.

17. The process of claim 13, wherein the hydrophobic silica has a residual silanol content of less than 50%.

18. An elastic, electrically conductive shaped article obtainable by a process comprising the steps of:
A) producing a siloxane composition, wherein said siloxane composition comprises:

a) 0.1-5% by weight of CNTs;
b) 70-97.9% by weight of at least one siloxane selected from compounds of general formula (I)

$$(SiO_{4/2})_a(R^xSiO_{3/2})_b(R^x_2SiO_{2/2})_c(R^x_3SiO_{1/2})_d \qquad (I),$$

wherein the radicals $R^x$ are independently of one another selected from the group consisting of (i) hydrogen, (ii) —CH=CH$_2$, (iii) unsubstituted or fluorinated C$_1$-C$_{20}$-hydrocarbon radical, (iv) phenyl radical and (v) —OH and wherein the indices a, b, c and d indicate the number of the respective siloxane unit in the compound and independently of one another represent an integer in the range from 0 to 100 000, wherein a+b+c+d≥2;

c) 1-20% by weight of at least one hydrophobic silica which is surface-silylated with at least one organosilicon compound selected from organosilanes of formula (IV) and organosilazanes of formula (V)

$$R^1R^2R^3Si—Y \qquad (IV),$$

$$R^1R^2R^3Si—NH—SiR^1R^2R^3 \qquad (V),$$

wherein the radicals $R^1, R^2, R^3$ are each independently selected from halogenated or unsubstituted C$_1$-C$_{24}$-hydrocarbon radicals;
wherein the radical Y is selected from the group consisting of (i) halogen atom, (ii) —OR$^x$ and (iii) —OC(=O)OR$^x$, wherein R$^x$ is in each case selected from the group consisting of (i) hydrogen and (ii) substituted or unsubstituted C$_1$-C$_{24}$-hydrocarbon radical, wherein substituted is to be understood as meaning that at least one CH$_2$ group, but not the one bonded to silicon, may be replaced by —O—; and d) 0-5% by weight of other fillers;
wherein the proportions are based on the total weight of the composition and the components a) to d) sum to 100% by weight;
wherein the composition has a specific resistance of <20 Ω*cm based on 1% by weight of CNT;

B) reacting the siloxane composition with a hydrosilylation catalyst; and
C) forming the elastic, electrically conductive shaped article.

19. The process of claim 18, the siloxane composition is a siloxane mixture comprising:

a) 1-10% by weight of at least one H-siloxane of general formula (III) as a crosslinker $$(R^x_2SiO_{2/2})_c(HR^xSiO_{2/2})_{c'}(R^x_3SiO_{1/2})_2 \qquad (III),$$

wherein the radicals $R^x$ are independently of one another selected from the group consisting of (i) unsubstituted or fluorinated C$_1$-C$_{20}$-hydrocarbon radical and (ii) phenyl radical;
wherein the indices c and c' indicate the number of the respective siloxane unit in the compound;
wherein c is an integer in the range from 0 to 100 000;
wherein c' is an integer in the range from 3 to 100 000; and either b1) 90-99% by weight of at least one vinylsiloxane of general formula (IV)

$$(R^x_2SiO_{2/2})_c(ViR^x_2SiO_{1/2})_2 \qquad (IV),$$

wherein the radicals $R^x$ are independently of one another selected from the group consisting of (i) unsubstituted or fluorinated C$_1$-C$_{20}$-hydrocarbon radical and (ii) phenyl radical;
wherein the index c indicates the number of the respective siloxane unit in the compound and c=1001-100 000; or b2) 40-94% by weight of at least one vinylsiloxane of general formula (IIb')

$$(R^x_2SiO_{2/2})_c(ViR^x_2SiO_{1/2})_2 \qquad (IIb'),$$

wherein the radicals $R^x$ are independently of one another selected from the group consisting of (i) unsubstituted or fluorinated C$_1$-C$_{20}$-hydrocarbon radical and (ii) phenyl radical;
wherein the index c indicates the number of the respective siloxane unit in the compound and c=1-1000; and
0-50% by weight of at least one H-siloxane of general formula (IIa')

$$(R^x_2SiO_{2/2})_c(HR^x_2SiO_{1/2})_2 \qquad (IIa'),$$

wherein the radicals $R^x$ are independently of one another selected from the group consisting of (i) unsubstituted or fluorinated C$_1$-C$_{20}$-hydrocarbon radical and (ii) phenyl radical; and
wherein the index c indicates the number of the respective siloxane unit in the compound and c=1-100 000.

20. The process of claim 18, wherein the hydrophobic silica has a residual silanol content of less than 50%.

* * * * *